US008620817B2

(12) United States Patent
Tabet (10) Patent No.: US 8,620,817 B2
(45) Date of Patent: Dec. 31, 2013

(54) METHOD AND SYSTEM FOR CREATING LICENSE MANAGEMENT IN SOFTWARE APPLICATIONS

(75) Inventor: Marwan Tabet, Park Ridge, IL (US)

(73) Assignee: Flexera Software, Inc., Schaumburg, IL (US)

( * ) Notice: Subject to any disclaimer, the term of this patent is extended or adjusted under 35 U.S.C. 154(b) by 1386 days.

(21) Appl. No.: 11/531,962

(22) Filed: Sep. 14, 2006

(65) Prior Publication Data

US 2008/0071689 A1 Mar. 20, 2008

(51) Int. Cl.
*G06F 21/00* (2013.01)

(52) U.S. Cl.
USPC .......... 705/59; 705/50; 705/51; 726/26; 726/27; 726/28; 726/29; 726/30; 713/189; 713/191; 717/178; 717/172; 717/173; 717/174; 717/177

(58) Field of Classification Search
USPC .......... 705/50, 51, 59; 726/26–30; 717/168–178
See application file for complete search history.

(56) References Cited

U.S. PATENT DOCUMENTS

| | | | | | |
|---|---|---|---|---|---|
| 5,019,963 | A * | 5/1991 | Alderson et al. | | 1/1 |
| 5,553,139 | A * | 9/1996 | Ross et al. | | 705/59 |
| 5,671,412 | A * | 9/1997 | Christiano | | 1/1 |
| 5,835,777 | A * | 11/1998 | Staelin | | 717/175 |
| 5,903,650 | A * | 5/1999 | Ross et al. | | 705/59 |
| 5,953,533 | A * | 9/1999 | Fink et al. | | 717/175 |
| 6,009,401 | A * | 12/1999 | Horstmann | | 705/317 |
| 6,044,469 | A * | 3/2000 | Horstmann | | 726/29 |
| 6,055,503 | A * | 4/2000 | Horstmann | | 705/51 |
| 6,117,187 | A * | 9/2000 | Staelin | | 717/169 |
| 6,289,452 | B1 * | 9/2001 | Arnold et al. | | 713/175 |
| 6,317,880 | B1 * | 11/2001 | Chamberlain et al. | | 717/174 |
| 6,334,214 | B1 * | 12/2001 | Horstmann | | 717/170 |
| 6,363,356 | B1 * | 3/2002 | Horstmann | | 705/26.7 |
| 6,493,871 | B1 * | 12/2002 | McGuire et al. | | 717/173 |
| 6,779,178 | B1 * | 8/2004 | Lloyd et al. | | 717/174 |
| 6,912,711 | B1 * | 6/2005 | Curtis et al. | | 717/173 |
| 6,920,567 | B1 * | 7/2005 | Doherty et al. | | 726/22 |
| 7,007,170 | B2 * | 2/2006 | Morten | | 713/193 |
| 7,392,517 | B2 * | 6/2008 | Berstis | | 717/167 |
| 7,461,086 | B1 * | 12/2008 | Hurren et al. | | 1/1 |
| 7,571,467 | B1 * | 8/2009 | Priestley et al. | | 726/6 |
| 7,703,078 | B2 * | 4/2010 | Radatti et al. | | 717/127 |
| 7,720,765 | B1 * | 5/2010 | Pesl | | 705/54 |
| 7,761,606 | B2 * | 7/2010 | Sunder et al. | | 709/250 |
| 7,853,609 | B2 * | 12/2010 | Dehghan et al. | | 707/778 |
| 7,870,399 | B2 * | 1/2011 | Bryant et al. | | 713/193 |
| 7,930,273 | B1 * | 4/2011 | Clark et al. | | 707/638 |
| 7,971,196 | B2 * | 6/2011 | Berstis | | 717/140 |
| 8,136,100 | B1 * | 3/2012 | Goldman | | 717/136 |
| 8,230,417 | B1 * | 7/2012 | Clark et al. | | 717/174 |
| 8,375,381 | B1 * | 2/2013 | Clark et al. | | 717/170 |
| 8,448,161 | B2 * | 5/2013 | Goldman | | 717/170 |
| 2001/0034846 | A1 * | 10/2001 | Beery | | 713/201 |

(Continued)

*Primary Examiner* — Mamon Obeid
(74) *Attorney, Agent, or Firm* — Michael A. Glenn; Perkins Coie LLP (57) ABSTRACT

A method and system for creating license management in software applications are disclosed. In one embodiment, the method comprises receiving an installer package associated with a software application to be run on a computer, the installer package not including license administration functionality. One or more executable files are extracted from the installer package. One or more license-enabled executable files are generated with the one or more executable files and a license wrapper. A new installer package is created with the one or more license-enabled executable files, the new installer package supporting the license administration functionality.

17 Claims, 4 Drawing Sheets

(56) References Cited

U.S. PATENT DOCUMENTS

| | | | |
|---|---|---|---|
| 2003/0060188 A1* | 3/2003 | Gidron et al. | 455/408 |
| 2003/0233490 A1* | 12/2003 | Blaser et al. | 709/328 |
| 2005/0055686 A1* | 3/2005 | Buban et al. | 717/170 |
| 2008/0141245 A1* | 6/2008 | Berstis | 717/178 |
| 2010/0131926 A1* | 5/2010 | Younce et al. | 717/122 |

* cited by examiner

METHOD AND SYSTEM FOR CREATING LICENSE MANAGEMENT IN SOFTWARE APPLICATIONS

FIELD OF THE INVENTION

The field of the invention relates generally to computer systems and more particularly relates to a method and system for creating license management in software applications.

BACKGROUND OF THE INVENTION

Generally, in an enterprise environment, an administrator or IT manager is responsible for ensuring compliance with license agreements for software applications deployed in an enterprise. Sophisticated license management software has been developed for managing software licenses for computer networks.

These systems operate with a license server connected to a network of users. The license server stores and manages software licenses for the network users, in accordance with a license management program stored on the server. Each copy of a protected software program on the network is accompanied by a program code corresponding to a shell (also known as "wrapper") or library of Application Program Interface (API) functions, which communicates with the license management program on the server. When a user starts to run the protected software program, the shell code or library of API functions provided with the program communicates a request to use a license to the license server, over the network.

The server, under the control of the license management software, responds to the request to determine whether it is storing an available license for the protected software program. If so, the server communicates an authorization message to the user and decrements a count of available licenses stored by the server. If not, the server communicates another message to the user, indicating that no licenses are available. In this manner, licenses are always stored and managed on a network license server. Each network user may have a copy of a protected software program, but must communicate with the license server for authorization to use the protected program.

License management systems which employ a license server, as discussed above, provide significant advantages with respect to the freedom to readily add, delete or change authorized users on the network, and the ability to readily control and alter licensing schemes (for example, to add or delete licenses or change conditions for licenses) by modifying only the license server files or programs. However, license management is often not include with smaller installation packages where the development of license management mechanisms are expensive and labor intensive.

SUMMARY

A method and system for creating license management in software applications are disclosed. In one embodiment, the method comprises receiving an installer package associated with a software application to be run on a computer, the installer package not including license administration functionality. One or more executable files are extracted from the installer package. One or more license-enabled executable files are generated with the one or more executable files and a license wrapper. A new installer package is created with the one or more license-enabled executable files, the new installer package supporting the license administration functionality.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

A method and system for managing and organizing software package installations are disclosed. In one embodiment, the method comprises receiving an installer package associated with a software application to be run on a computer, the installer package not including license administration functionality. One or more executable files are extracted from the installer package. One or more license-enabled executable files are generated with the one or more executable files and a license wrapper. A new installer package is created with the one or more license-enabled executable files, the new installer package supporting the license administration functionality.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
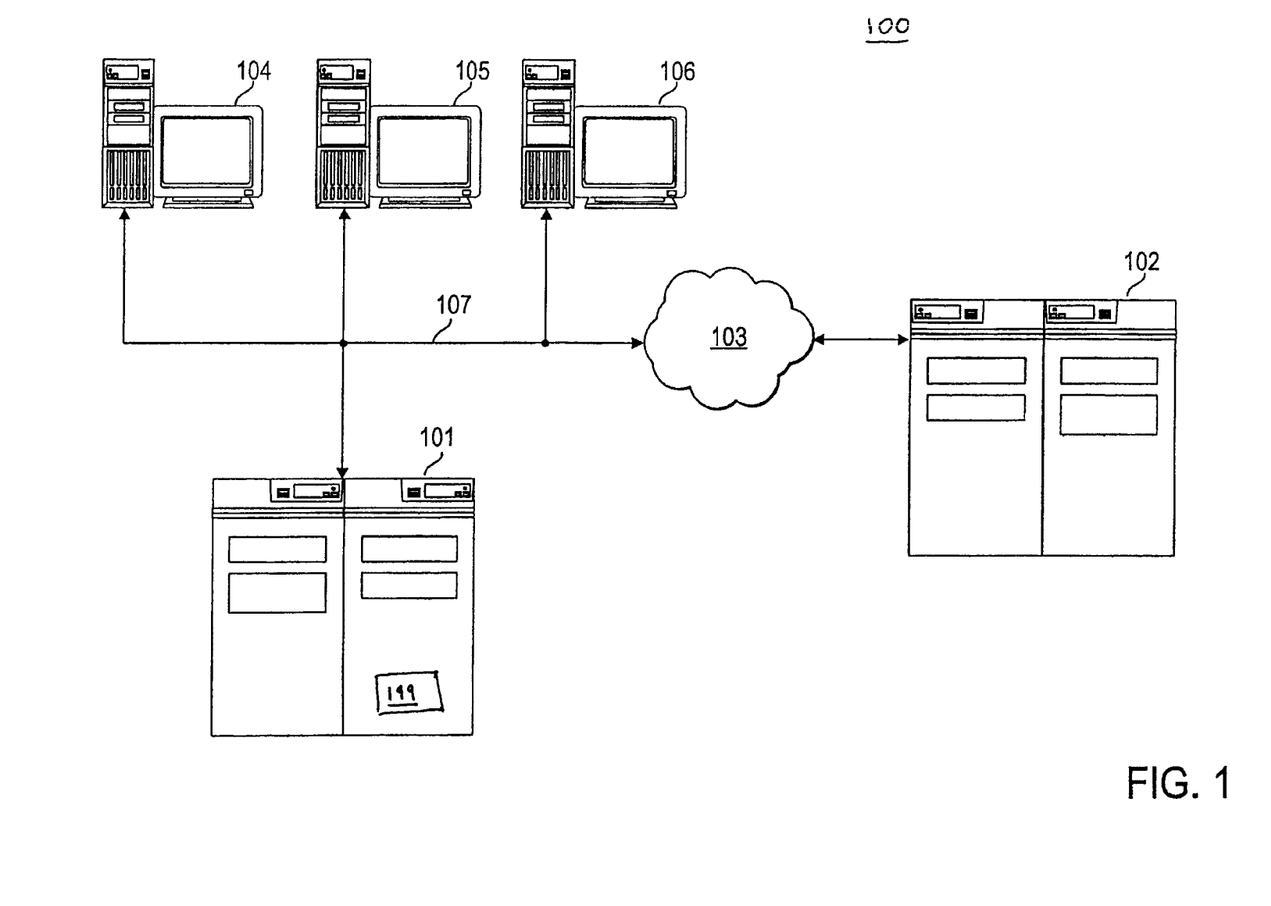
FIG. 1 illustrates a block diagram of an exemplary software license management system, according to one embodiment of the present invention.

FIG. 1 illustrates a block diagram of an exemplary software license management system, according to one embodiment of the present invention. In addition to license management systems, it is to be appreciated that other systems employing the various teachings herein may also be used to practice the various aspects of the present invention, and as such, are considered to be within its full scope.

System 100 includes a front-end server 101 (also known as a primary license server) that is configurable to control usage of licensed software, and optionally, may also securely communicate with a back-end server 102 (also known as a vendor license server) available at a designated destination, such as via a direct dial-up telephone number, an Internet Uniform Resource Locator (URL), an email address or other networking address. An IT manager uses system 100 to facilitate compliance with software licenses used by members of his/her organization. Some software application vendors embed licensing features into the software applications, but many software applications have no licensing features. The present method and system allow for license compliance and monitoring for software applications that have no licensing features built-in. According to one embodiment, the software application's executable files are not modified.

The resulting licensed software application is operative on various front-end computers (also known as clients) connected in a network 107, including the front-end server 101 and other computers represented as computers 104-106. System 100 represents one of many license management configurations, where clients 104-106 connect directly to the primary license server 101 to obtain licenses. Primary license server 101 includes license management software.

The network 107 may be a Local Area Network (LAN), Wide Area Network (WAN), Virtual Private Network (VPN), or other network that is managed or otherwise controlled by a customer of the licensed software. Communication between the front-end server 101, which preferably resides at a location designated or authorized by the customer of the licensed software, and the back-end server 102, which preferably resides at a location designated or authorized by a vendor of the licensed software, is performed through a communication medium 103, such as the Internet, a private network or a direct dial-up connection. In the case of the Internet, secure transmission of messaging is preferably performed, for example, using the Secure Sockets Layer protocol (SSL), and a Virtual Private Network (VPN).

Alternatively, any one or more of the front-end computers represented by front-end computers 104-106 on the network 107 may be configured, instead of or in addition to the front-end server 101, to control usage of its licensed software and/or the licensed software of other such computers, generate e-mail messages, and securely transmit the e-mail messages to the back-end server 102. Accordingly, as used herein and in the following claims, the term "front-end server" is understood to also include such front-end computers when performing such functions. In addition to certain of the front-end computers being configured to run the licensed application software, the front-end server 101 may also be so configured.

The back-end server 102 is configured to receive, authenticate, and process license management messages, the e-mail messages, and deliver the e-mail messages to the end recipient that could be an individual or software entity, such as business operations software. Examples of such business operations software include enterprise resource planning software (ERP), e-commerce software (such as those used for performing transactions over the Internet), customer relationship management software (CRM), and sales force automation software (SFA). According to one embodiment, functions of back-end server 102 are available in front-end server 101 for monitoring compliance with license restrictions.

Figure 2:
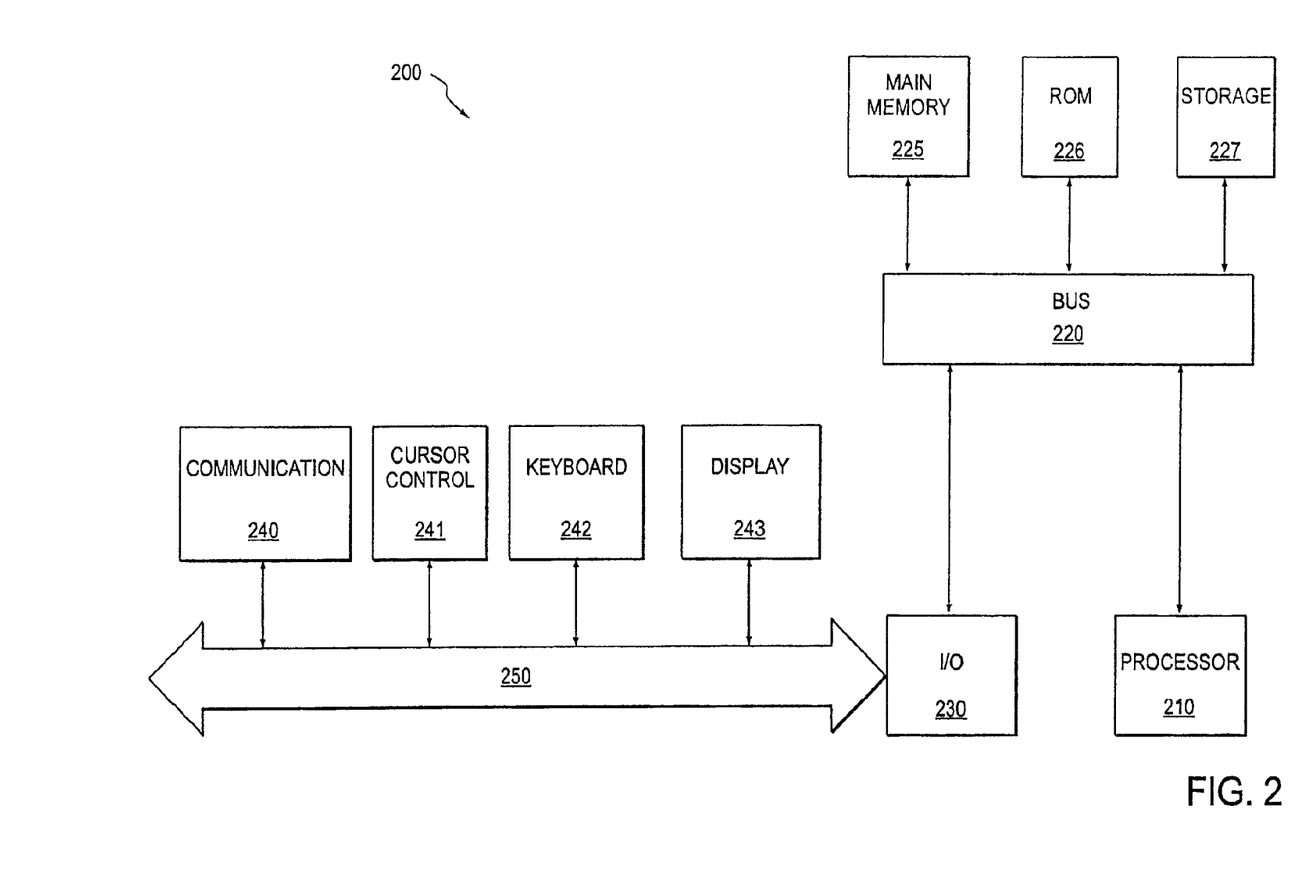
FIG. 2 illustrates an exemplary computer architecture for use with the present system, according to one embodiment of the invention.

FIG. 2 illustrates an exemplary computer architecture for use with the present system, according to one embodiment of the invention. Computer architecture 200 can be used to implement both front-end computers (clients) 104-106, front-end servers 101, and back-end servers 102 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, web pages and business related information may be presented to the user on the display device 243.

The communication device 240 allows for access to other computers (servers or clients) via a network. The communication device 240 may comprise a modem, a network interface card, a wireless network interface or other well known interface device, such as those used for coupling to Ethernet, token ring, or other types of networks.

Figure 3:
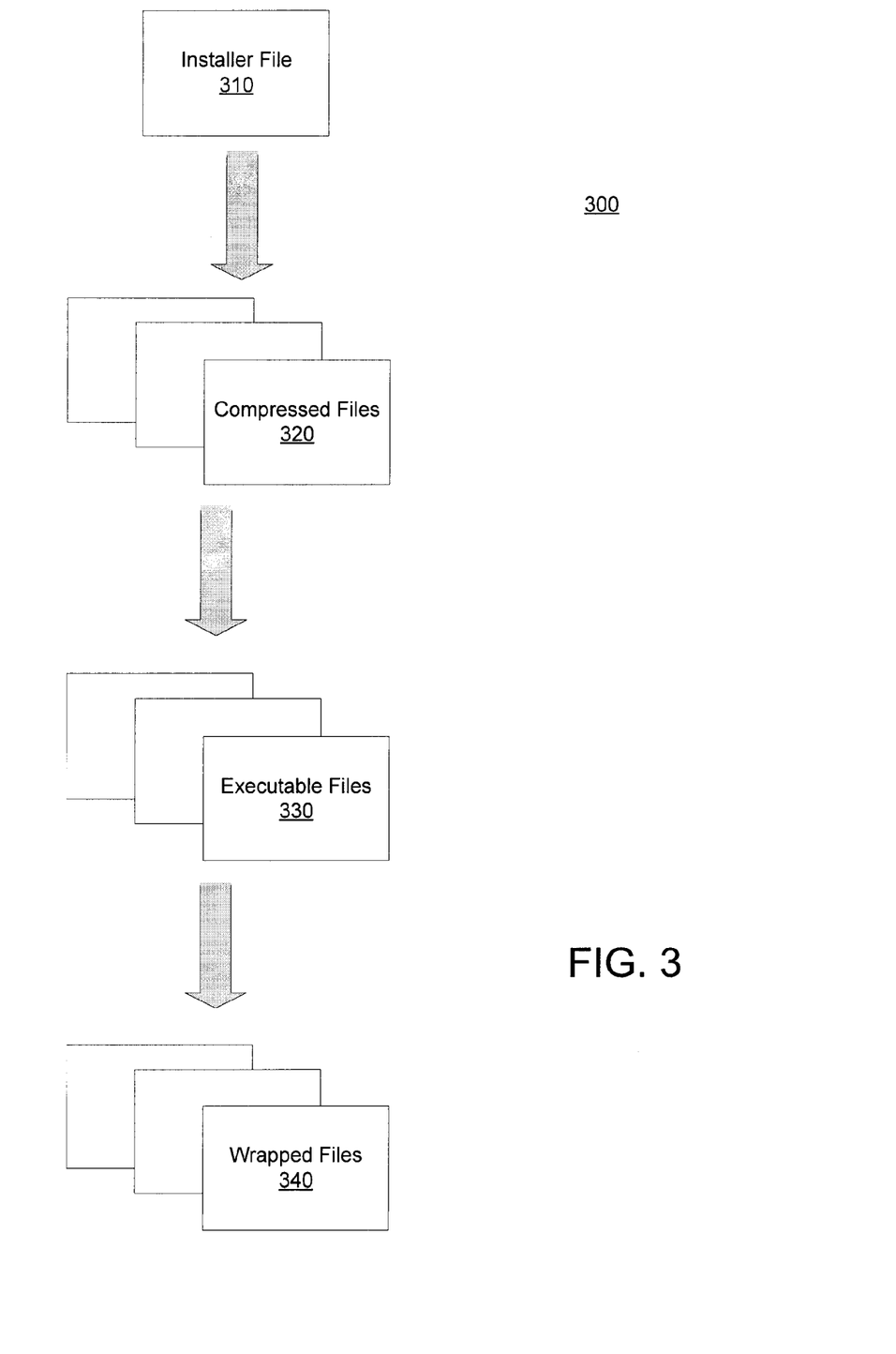
FIG. 3 illustrates an exemplary file-wrapping process, according to one embodiment of the present invention.

FIG. 3 illustrates an exemplary file-wrapping process 300, according to one embodiment of the present invention. A software application may be distributed by the manufacturer in the form of an installer file 310. According to one embodiment, the installer file is a Microsoft Windows Installer. The Windows Installer (previously known as Microsoft Installer, codename Darwin) is an engine for the installation, maintenance, and removal of software on modern Microsoft Windows systems. The installation information, and often the files themselves, are packaged in installation packages, loosely relational databases structured as OLE Compound Storage Files and commonly known as "MSI files", from their default file extension (compare: .deb, RPM).

When the installer file 310 is run, a number of compressed files 320 are extracted from the installer file 310. According to one embodiment, the compressed files 320 are Microsoft cabinet files and commonly known as "CAB files". CAB is the Microsoft Windows native compressed archive format. It supports compression and digital signing, and is used in a variety of Microsoft installation engines: Setup API, Device Installer, AdvPack (for the installation of ActiveX components from Internet Explorer) and Windows Installer.

The compressed files 320, when uncompressed, generate a number of executable files 330, commonly known as ".EXE files." EXE is the common filename extension for denoting an executable file (a program) in the MS-DOS, Microsoft Windows, and OS/2 operating systems. A wrapper file is generated that includes license management capabilities. According to one embodiment of the present method and system, the executable files 330 are wrapped with the wrapper file to generate wrapped files 340. According to one embodiment, the wrapped files 340 are provided with a .exe extension, and are executable. Accordingly, the wrapped files 340 have the same file name and same icon as the original unwrapped executable file. From the user's perspective, the wrapped file 340 (and shortcuts made to the wrapped file 340) look the same as the original.

Figure 4:
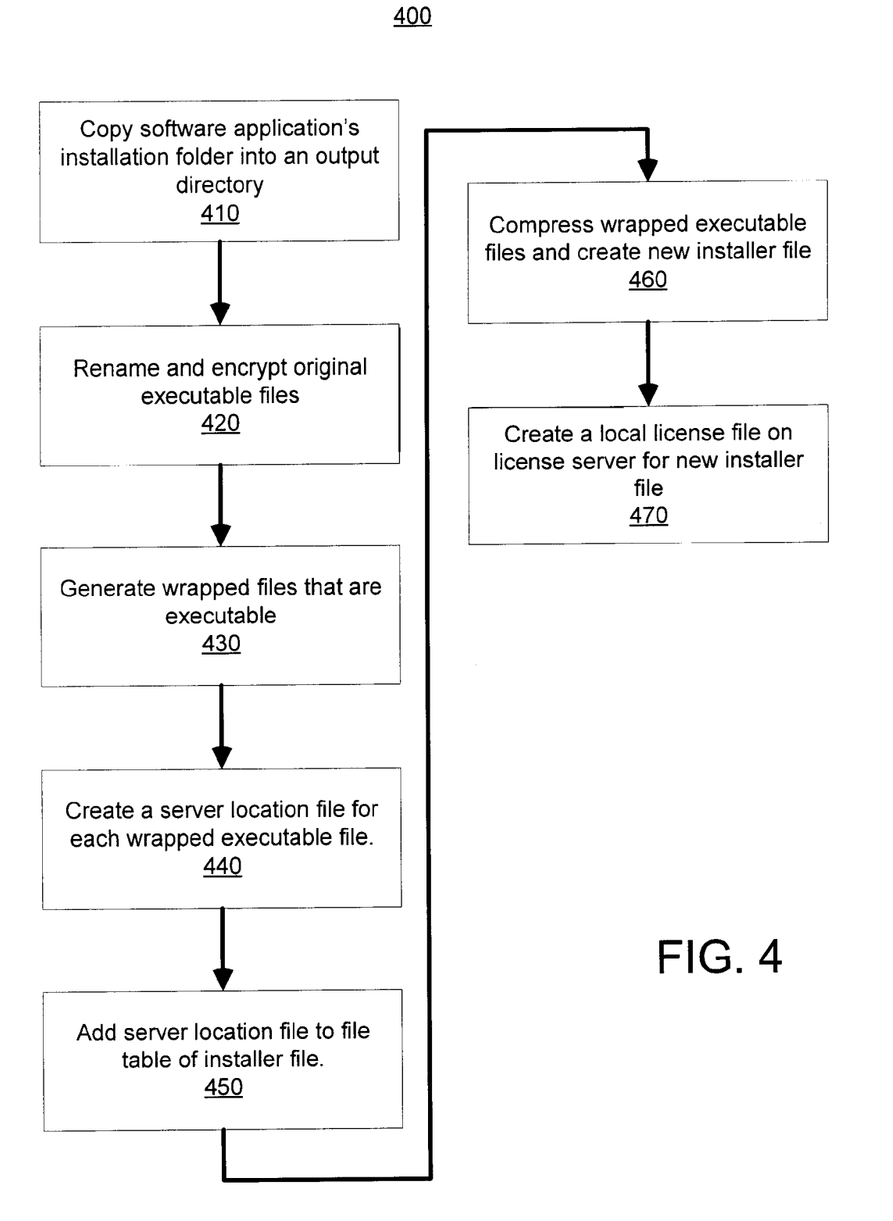
FIG. 4 illustrates an exemplary license-enabling process, according to one embodiment of the present invention.

FIG. 4 illustrates an exemplary license-enabling process 400, according to one embodiment of the present invention. License-enabling process 400 may be executed by front-end server 101, which includes a license-enabling module 199. According to one embodiment, the license-enabling module 199 may be a software application, such as FLEXnet AdminStudio manufactured by Macrovision Corporation of Santa Clara, Calif. License-enabling module 199 allows a software application that does not include licensing management and control to be modified to permit license administration by a license server. The license server may be back-end server 102 or front-end server 101 running license server software, such as a FLEX license server manufactured by Macrovision Corporation of Santa Clara, Calif.

Once a software application without licensing management is available, license-enabling module 199 copies the source software application's installation folder into an output directory of front-end server 101 (410). The installation file is processed to generate executable files as described in process 300. The original executable files are renamed and optionally, encrypted (420). Wrapped executable files are generated as described in process 300 (430).

A server location file is created for each wrapped executable file (440). The server location is added to the installer file's file table as appropriate (450). The wrapped executable files are compressed and a new installer file is generated that includes the server location information (460). A local license file is created on the license server (470). According to another embodiment, instructions are also included with the new installer file to allow use, installation and access to the application via a standalone computer (eg. a PC that cannot reach the license server).

After completing process 400, license management capabilities are added to a software application that did not previously include them. For installations using the new installer file, license management capabilities may include the ability to track usage of applications in network 100. Specific users may be traced to a specific individual and machine, such as clients 104-106. Reports may be generated showing concurrent usage, installations, users, and machines. Additional license management capabilities include the enforcement of application license limits—setting the number of concurrent users permitted to run an application equal to the number of licenses that have been purchased, enabling the enterprise to comply with the terms and conditions of its software license agreements.

According to one embodiment of the present invention, process 400 is automated with a wrapping assistant that is included in licensing-module 199. The wrapping assistant prompts a user to select executable files to be wrapped, to set limits for the number of concurrent licenses available for the application, to define access limits to groups of users, to configure a connection to the license server and to finalize a new installer file.

Other license management capabilities include:
Enablement of overdraft licenses during peak usage times to determine accurate license requirements—users may be allowed to run a software package even after its license limit has been reached, and then generate a report on actual usage. Additional licenses may then be purchased, enabling the enterprise to only purchase the number of licenses that it needs.
Enablement of application usage during server down time—the wrapped application may be run without a license when the license server is down or cannot be contacted, providing uninterrupted access to your wrapped applications.
Specify handling options for concurrent use—Instead of requiring a license for each concurrent user (the default setting), this restriction may be modified by selecting a different grouping option to determine license requirements. It may be specified that any of the following groupings would require only one license:
Host—All concurrent requests from the same computer
User—All concurrent requests from the same user
User+Host—All concurrent requests from the same user on the same computer
Site—All concurrent requests from the same site
Set license expiration date—A date may be set when all licenses for an application would expire.
Queuing behavior—When the license limit is reached, the application may launch automatically when a license becomes available. The user may be prompted to choose if she wants to wait for an available license and display a list of current users, or inform the user that she should attempt to run the application at a later time.

When a user launches the new installer file to install the software application associated with that installer file, license management is added to the installation to enforce license restrictions. Once the software application is installed on a client 104-106, each time a user launches the modified software application, license management is in place and transparent to the user. The modified software application obtains the location of the license server 101-102 from its server location file. The modified software application contacts the license server and attempts to obtain a license for the software application. The license server may then check-out a license to the user according to the licensing rules. Information is written into a log for reporting purposes.

If an installer file 310 contains multiple executables, all of the executables may be specified to belong to the same suite and therefore require only one license. For example, if a Windows Installer package named GraphicsUtilties.msi includes a drawing application (draw.exe), a screen capture application (capture.exe), and a page layout application (layout.exe), these applications may be treated as a suite so that the user would only have to purchase one license to activate all applications in the suite.

When an installer file 310 is wrapped as described in process 300, the selected .exe files are renamed and given a .fwr extension. A copy of a wrapper file is made for each selected .exe file, giving each file the executable's original file name and icon. All of these files are compressed back into a new installer (eg., .msi) file. Because the original, unwrapped executables are installed along with the wrapped executables, it is possible for a user to rename the executable files with the .fwr extension back to having an .exe extension, and to launch the original, unwrapped executables and bypass the licensing limits you have set. Therefore, to prevent users from running non-license-injected versions of the wrapped executables, the original executable file(s) may be encrypted. This would make it impossible for the original executable files to run.

In order to create a new license file (stored on a license server) to be used with the newly license-enabled software application, license-enabling module 199 allows a user to set license parameters for the licenses stored by the license server. The following licensing parameters may be used:

Application Program
  This parameter must be identical (including case and excluding .exe) to the name of the binary to be wrapped (eg., the name of the .exe file).

License Limit
  This parameter is the license limit—the number of licenses that the License Server will allow to be checked out simultaneously, not including overdraft.

Overdraft
  This parameter is the number of licenses above the license limit that the License Server will allow to be checked out. Use this parameter if usage reports on usage are required and license limits are not enforced. Reports will show the license limit as the maximum number of licenses available, and any usage exceeding this limit will be overdraft usage.

Program Suite
  Some vendors sell their products as a suite. A suite is a group of independent programs which must, for licensing purposes, be treated as a unit.
  For example, if a product suite, Office, consists of programs Word, Paint, and Mail, and if you have only one license for the suite, then while one user was using Word, that same user could use products Paint or Mail, but a different user could not use any products—even Paint or Mail, which are not currently in use.
  Typically, to create the licenses for a product suite, licenses with the Group by (duplicate license request) parameter set so that multiple requests from the same user (or the same user on the same host) count as one license request.
  When create a suite license is created, the new license-enabled software application checks out both the individual program license (Word in the example above) and a suite license (Office in the example). Since a second license request for Office does not require an additional license, when the same user runs program Paint, he is able to check out the Office suite license, and is also allowed to check out the Paint license. If another user attempts to check out a license for Paint, she would be unable to get the Office suite license and her request would be denied (or queued).
  An application is made part of a suite by using the optional PREREQ attribute of a license FEATURE line. PREREQ is set to a FEATURE that is checked out before the wrapped application is executed.
  To create a suite a PREREQ line is added to all FEATUREs that will be part of the suite. The suite's FEATURE is created in the license file. A full suite FEATURE looks like:

---

FEATURE suite name swrap 1.0 expiration count 0 \
  DUP_GROUP=[UHDS]

---

According to one embodiment, this is identical to an application's FEATURE line except that only the DUP_GROUP optional attribute is pertinent.

Expiration Date
  The date the license for this FEATURE will expire. Licenses can no longer be obtained after this date.

Node-Lock Hostid
  This is the hostid of the only machine(s) on which the wrapped application can run. This field can contain multiple hostids separated by spaces and surrounded by double quotes.

Application File to Run
  Unless specified otherwise, when the Wrapper obtains a license, it will run binary.fwr in the directory from which the Wrapper ran. If it is desirable to run a different binary, specify the full path to the binary name here. This will become part of the FEATURE line as w_binary=full_path_to_binary.

Queuing Behaviour
  Queue/Always—Queue for a license if one cannot be obtained. When a license becomes available, the binary will run. This is for use when failsafe is not on. This is recommended for batch jobs. (w_queue=1)
  Query/Ask—If a license cannot be obtained, shows who is using the licenses and asks the user if they want to queue for a license. If the user answers Y, the Wrapper will wait until a license is available. When one becomes available, the binary will run. (w_queue=2)
  Exit/Never—No queuing.

The present system allows that simultaneous uses of the wrapped application by the same user (or host, or user/host combination, etc.) will not require a license. The default is that each process requires its own license. Groups may be set on:

Duplicate Grouping
  User—All requests from the same user use only one license.

Host—All requests from the same host use only one license.
User+Host—All requests from the same user on the same host use one license.
Site—All requests use one license.
If you wish to strictly enforce your license limits, then when a license cannot be obtained, the binary will not run. This will not appear on the FEATURE line.

---

If you want the binary to run even if it cannot obtain a license, VENDOR_STRING=failsafe appears on the FEATURE line.

---

Regular (License) Failsafe Mode
For License Server failsafe mode, where the application will never fail to run because it cannot connect to the FLEXwrap License Server, the Wrapper must be able to see the license file when the License Server is down.
If the license server becomes unavailable (due to a license server node failure, a license server process failure, or a network communication problem), the application will lose its license.
The software application will attempt to regain its license until the timeout (or exit) period elapses. By default, there is no timeout (or exit) period, so the application will continue to run without a license and will continue to attempt to regain its license indefinitely.
Connection Timeout
If a timeout period is specified, the wrapped application will continue to run for the specified amount of time while the application attempts to regain its license. The application will give periodic warnings to the user. For example, if the timeout is set to ten minutes, the user will get ten messages like this:
Lost license for feature.
Reconnection attempt n of 10.
If a license can be obtained before the timeout period ends, the user will see Reacquired feature license. If the timeout period is reached and a license has not been obtained, the application will exit with the message Lost license. Exiting.

Although the present method and system have been described in connection with a software distribution system, one of ordinary skill would understand that the techniques described may be used in any situation where it is to effectively manage and organize various software.

A method and system for creating license management in software applications have been disclosed. Although the present methods and systems have been described with respect to specific examples and subsystems, it will be apparent to those of ordinary skill in the art that it is not limited to these specific examples or subsystems but extends to other embodiments as well.

I claim:

1. A computer-implemented method, comprising:
receiving, from a vendor, an installer package associated with a software application to be installed on a client computer, the installer package not including license administration functionality, wherein the license administration functionality includes tracking usage of the software application, and enforcing license limits of the software application;
extracting one or more executable files from the installer package and creating a new installer package wherein creating a new installer package comprises:
generating one or more license-enabled executable files with the one or more extracted executable files and a license wrapper;
adding license server location for each license-enabled executable file to the new installer package; and
packaging the one or more license enabled executable files into the new installer package, the new installer package supporting the license administration functionality; and
executing the new installer package on the client computer to install the software application on the client computer and permit managing of software licensing rights of said software application by obtaining the location of the license server from the new installer package, contacting the license server, and obtaining a license for the software application.

2. The computer-implemented method of claim 1, further comprising linking the one or more license-enabled executable files to entries in a server location file.

3. The computer-implemented method of claim 2, further comprising generating a license file associated with the new installer package for use on a license server.

4. The computer-implemented method of claim 1, the license administration functionality further including enabling overdraft licenses, enabling application usage when the license server is unavailable, and setting a license expiration date.

5. The computer-implemented method of claim 1, wherein the installer package is a Microsoft installer file.

6. The computer-implemented method of claim 1, further comprising: renaming the one or more executable files; and encrypting the one or more executable files.

7. The computer-implemented method of claim 1, further comprising installing the software package on a client using the new installer package.

8. The computer-implemented method of claim 7, further comprising retrieving a license file from a license server, wherein the license file is used for license administration functionality.

9. A non-transitory computer-readable medium having stored thereon a plurality of instructions, said plurality of instructions when executed by a computer, cause said computer to perform:
receiving, from a vendor, an installer package associated with a software application to be installed on a client computer, the installer package not including license administration functionality, wherein the license administration functionality includes tracking usage of the software application and enforcing license limits of the software application;
extracting one or more executable files from the installer package and creating a new installer package wherein creating a new installer package comprises:
generating one or more license-enabled executable files with the one or more extracted executable files and a license wrapper;
adding license server location for each license-enabled executable file to the new installer package; and
packaging the one or more license-enabled executable files into the new installer package, the new installer package supporting the license administration functionality; and
executing the new installer package on the client computer to install the software application on the client computer and permit managing of software licensing rights of said software application by obtaining the location of the license server from the new installer package, contacting the license server, and obtaining a license for the software application.

10. The computer-readable medium of claim 9, wherein the plurality of instructions cause the computer to perform linking the one or more license-enabled executable files to entries in a server location file.

11. The computer-readable medium of claim 10, wherein the plurality of instructions cause the computer to perform generating a license file associated with the new installer package for use on a license server.

12. The computer-readable medium of claim 9, wherein the license administration functionality further includes enabling overdraft licenses, enabling application usage when the license server is unavailable, and setting a license expiration date.

13. The computer-readable medium of claim 9, wherein the installer package is a Microsoft installer file.

14. The computer-readable medium of claim 9, wherein the plurality of instructions cause the computer to perform: renaming the one or more executable files; and encrypting the one or more executable files.

15. The computer-readable medium of claim 9, wherein the plurality of instructions cause the computer to perform installing the software package on a client using the new installer package.

16. The computer-readable medium of claim 15, wherein the plurality of instructions cause the computer to perform retrieving a license file from a license server, wherein the license file is used for the license administration functionality.

17. A system, comprising:
a license server in communication with a network; and
a client computer in communication with the network, the client computer configured to receive an installer package from a vendor, said installer package associated with a software application to be installed on the client computer, the installer package not including license administration functionality, wherein the license administration functionality includes tracking usage of the software application, and enforcing license limits of the software application;
extracting one or more executable files from the installer package and creating a new installer package, wherein creating a new installer package comprises:
generating one or more license-enabled executable files with the one or more extracted executable files and a license wrapper;
adding license server location for each license-enabled executable file to the new installer package; and
packaging the one or more license-enabled executable files into the new installer package, the new installer package supporting the license administration functionality; and
executing the new installer package on the client computer to install the software application on the client computer and permit managing of software licensing rights of said software application by obtaining the location of the license server from the new installer package, contacting the license server, and obtaining a license for the software application.

\* \* \* \* \*